United States Patent
Berrondo et al.

(10) Patent No.: US 6,711,255 B2
(45) Date of Patent: Mar. 23, 2004

(54) PREDICTIVE DISTRIBUTION OF CALLS BETWEEN INQUIRY CENTERS

(75) Inventors: Vincent Berrondo, Grenoble (FR); Daniel Stern, Paris (FR); Prosper Chemouil, Saint-Michel sur Orge (FR)

(73) Assignee: France Telecom, Paris (FR)

( * ) Notice: Subject to any disclaimer, the term of this patent is extended or adjusted under 35 U.S.C. 154(b) by 393 days.

(21) Appl. No.: 09/933,152

(22) Filed: Aug. 21, 2001

(65) Prior Publication Data

US 2002/0041673 A1 Apr. 11, 2002

(30) Foreign Application Priority Data

Aug. 28, 2000 (FR) .............................. 00-11005

(51) Int. Cl.$^7$ ................................ H04M 3/00
(52) U.S. Cl. .............................. 379/266.06; 379/266.04
(58) Field of Search ...................... 379/266.06, 266.04

(56) References Cited

U.S. PATENT DOCUMENTS

| | | | | |
|---|---|---|---|---|
| 5,291,552 A | * | 3/1994 | Kerrigan et al. ....... | 379/266.04 |
| 5,335,268 A | * | 8/1994 | Kelly et al. ............ | 379/112.05 |
| 5,384,841 A | * | 1/1995 | Adams et al. ......... | 379/266.04 |
| 5,506,898 A | | 4/1996 | Costantini et al. | |
| 5,530,744 A | | 6/1996 | Charalambous et al. | |
| 5,590,188 A | * | 12/1996 | Crockett ................ | 379/265.02 |
| 5,864,616 A | * | 1/1999 | Hartmeier .............. | 379/265.03 |

FOREIGN PATENT DOCUMENTS

EP           0772335          5/1997

* cited by examiner

Primary Examiner—Ahmad F. Matar
Assistant Examiner—Rasha S Al-Aubaidi
(74) Attorney, Agent, or Firm—Lowe Hauptman Gilman & Berner, LLP

(57) ABSTRACT

The distribution of calls to directory inquiry centers is concentrated in a server which reduces the traffic between the centers. For a given center, the server cyclically determines a forecast waiting time of the calls as a function of an average waiting time per call which it estimates for the given center, and compares the forecast waiting time with two thresholds so as to decide to route the calls to the given center or to another, less heavily loaded, inquiry center, and with two other thresholds so that the given center accepts calls from other, more heavily loaded centers, or refuses them if it is itself saturated.

11 Claims, 4 Drawing Sheets

PREDICTIVE DISTRIBUTION OF CALLS BETWEEN INQUIRY CENTERS

BACKGROUND OF THE INVENTION

1. Field of the Invention

The present invention relates to the waiting time of telephone calls in inquiry centers, also called call centers or telephone-call response centers, and more particularly a distribution of calls to directory inquiry centers depending on the waiting time of the calls in them.

2. Description of the Prior Art

The U.S. Pat. No. 5,506,898 presents a method of estimating a waiting time in an inquiry center having several call queues as a function of priorities, so as to signal, by voice messaging, to each person requesting a call, the actual waiting time for obtaining an agent of the center.

If Q calls are already present in the queue, and if the inquiry center is dealing with one call on average every S seconds, the forecast waiting time AP is defined by $AP=Q \times S$. The forecast waiting time AP is therefore the time which it would take for a call to go from the last place, in this instance the Qth place, to the first place in the queue.

The service duration perceived by the user is defined as being the average rate of progress in the queue, that is to say the time which it takes for a call to progress from one place to the next in the queue. The service duration perceived by the user is then updated upon each pick-up by an operator in the inquiry center, i.e. upon each response to a current call by the time which the current call has been on hold divided by the number of calls enqueued in the queue at the instant when the current call was parked in the queue. The service duration $S_n$ perceived by the user is deduced from the following relationship according to the U.S. Pat. No. 5,506,898:

$$S_n = \beta \times S_{n-1} + (1-\beta) \times TAF.$$

$S_{n-1}$ designates the service duration perceived by the user for the last call preceding the current call, and TAF designates the average rate of advance through the queue for the last call. $\beta$ is a factor, typically 0.95, corresponding to a very heavy weighting of the irregularities in the service duration perceived by the user.

The reactivity to the change of the number of agents in the inquiry center is immediate according to the U.S. Pat. No. 5,506,898, since the staff numbers allocated to each group of queues are known. Consequently, the variations in the numbers of agents are reflected instantly on the service duration $S_n$ perceived by the user by applying the multiplying factor $$\rho = (\text{new staff number})/(\text{old staff number}).$$

The European patent application No. 772,335 describes a distribution of the calls in a system comprising several inquiry centers independent of one another. Each call is associated with a local inquiry center which should deal with the call in priority. If the local inquiry center is overloaded, calls which are associated with it can be directed to another, less heavily loaded, remote inquiry center.

The estimating of the load is based on the forecast waiting time AP described in the abovementioned U.S. patent.

For each incoming call, all the inquiry centers which offer the same skills are capable of being interrogated, via the telephone network, so as to compare their forecast waiting times and to determine the best queue for the call, i.e. the queue where the waiting time is the shortest.

The priority of the local inquiry center, by comparison with the other inquiry centers interrogated, is accentuated by adding a time quantum (constant) to the forecast waiting times of the remote centers by comparison with the forecast waiting time of the local center, for determination of the best queue.

However, in the case of a heavy load on the entire network, the time quantum is not sufficient, and the calls are no longer dealt with by their local inquiry centers without the service in them being enhanced.

The call distribution according to the abovementioned European patent application requires a dialog between the centers which interrogate each other in order to ascertain their forecast waiting times, because of the absence of a centralized processing facility between the inquiry centers. These interrogations take place upon each call, or periodically, so as to reduce the service traffic between the inquiry centers generated by these interrogations, and they therefore generate supplementary traffic between the centers.

The absence of centralization also poses problems of administration of the system of the inquiry centers and, in general, exhibits the drawbacks of the non-centralized solutions such as duplication of data, difficult administration and difficult upgrade of the center-management software.

OBJECT OF THE INVENTION

The principal objective of the invention is to remedy the drawbacks of the methods according to the prior art set out above, and thus to concentrate the management of the calls of the inquiry centers and to reduce all supplementary traffic between the inquiry centers.

SUMMARY OF THE INVENTION

Accordingly, a method for distributing calls to directory inquiry centers, comprises a cycle of succeeding steps for a given inquiry center:

determining a forecast waiting time of the calls on the basis of a number of calls in waiting and of an estimated average waiting time per call in the given center, routing the calls to the given center when the determined forecast waiting time is below a first threshold, and accepting calls from other inquiry centers the forecast waiting times of which are above the first threshold, when the determined forecast waiting time is below a third threshold, routing the calls intended for the given center to another inquiry center on condition that the forecast waiting time in it is below the third threshold, when the determined forecast waiting time lies between the first threshold and a second threshold higher than the first threshold, and accepting calls from another inquiry center only if the forecast waiting time thereof is above the second threshold, when the determined forecast waiting time lies between the third threshold and a fourth threshold higher than the third threshold, and routing calls intended for the given center to another inquiry center the forecast waiting time of which is below the fourth threshold, when the determined forecast waiting time is above the second threshold, and refusing all calls from other inquiry centers when the determined forecast waiting time is above the fourth threshold.

This latter step of routing and refusing guarantees that the given inquiry center, when it is saturated, no longer receives traffic from other centers and thus ensures the stability of the centers as a whole.

In practice, each inquiry center to which calls from the given center are routed is selected from a predetermined list of inquiry centers attributed to the given center. When each inquiry center has a forecast waiting time below the third threshold, it is found among the inquiry centers which are available by running cyclically through said predetermined list. According to another embodiment, when said each inquiry center has a forecast waiting time below the fourth threshold, it exhibits the shortest forecast waiting time of the list.

The method is less complex when the first and third thresholds are equal, and the second and fourth thresholds are equal.

In order to ensure better operating stability for all the inquiry centers, they do not instantaneously change state upon one of the four thresholds being crossed by the forecast waiting time. In respect, the crossing of each threshold in a given direction by the determined forecast waiting time in the course of the cycle increments a count, and the step of routing or of accepting or of refusing depending on this threshold is performed only when the count reaches a predetermined number during cycles preceding said cycle.

The invention also resolves another problem posed by the main object, because of the lack of knowledge of the number of agents present in each center, and thus of the average waiting time in each center, by any system for concentrating the management of the centers which is situated outside the centers themselves.

According to the invention, the forecast waiting time of the calls is equal to the product $(Np+1)S_k^*$. Np denotes the number of calls placed in waiting in the given inquiry center which is incremented by one unity responsive to each call directed to the given center and which is decremented responsive to a pick-up for this call in the given center. $S_k^*$ denotes an estimated average waiting time between two pick-ups in the given center.

The average waiting time is estimated with the lack of knowledge of the number of agents in the given inquiry center. The estimated average waiting time $S_k^*$ is refreshed in response to the pick-up for each significant call in a queue in the given center according to the following relationship:

$$S_k^* = \alpha S_{k-1}^* + (1-\alpha)\Delta td.$$

$S_{k-1}^*$ denotes the estimated average waiting time for a preceding significant call, $\alpha$ a smoothing factor, and $\Delta td$ a difference between the instant of the pick-up for the significant call and the instant of the pick-up of the preceding call, whether it was or was not placed in waiting.

The smoothing factor is preferably determined as a function of the number of significant calls NAS per predetermined period, according to the formula:

$$\alpha = \sqrt[NAS]{0.1}$$

The invention concerns too a system for managing calls to directory inquiry centers. It is characterized in that it comprises a server which is linked to telephone exchange means serving the inquiry centers in order to receive call-processing signals from them, and which concentrates the management of the routing of the calls to the centers in accordance with the method of the invention. This concentration eliminates data exchanges between the inquiry centers and ensures better control for the operator of the inquiry centers as a whole. For example, the method of the invention may be implemented only during times of heavy traffic.

BRIEF DESCRIPTION OF THE DRAWINGS

Other features and advantages of the present invention will become more clearly apparent on reading the following description of several preferred embodiments of the invention, which description is given with reference to the corresponding accompanying drawings, in which.

DESCRIPTION OF THE PREFERRED EMBODIMENTS

Figure 1:
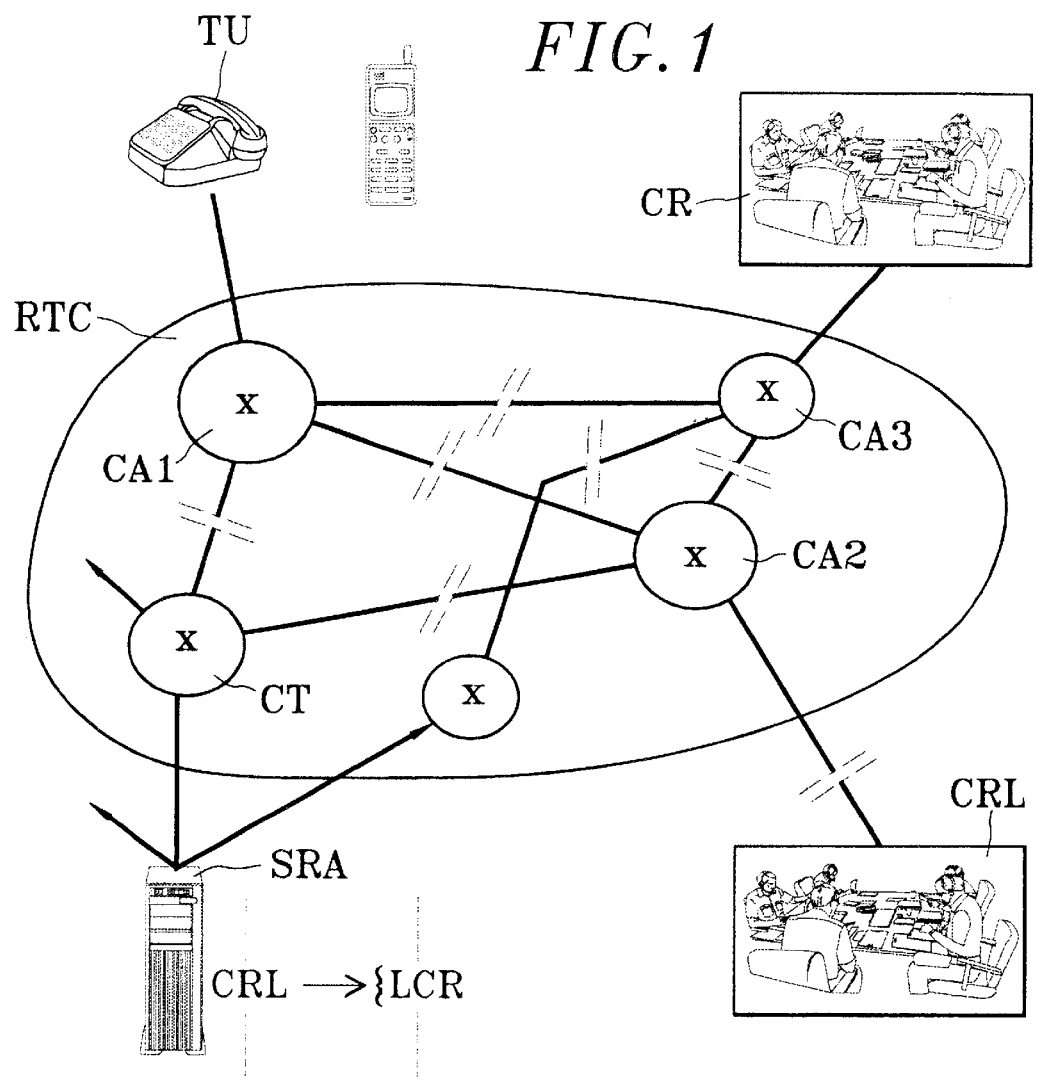
FIG. 1 is a block diagram of an inquiry-center system comprising a call-distribution server for implementing the method of the invention.

As shown diagrammatically in FIG. 1, in the switched telephone network RTC, a telephone-user terminal TU is attached to an autonomous-routing automatic exchange CA1.

In an intelligent-network architecture, each automatic telephone exchange is associated with a service-access exchange (Service Switching Point, SSP) which handles the access to predetermined services for the user terminals which it serves. In particular, in the context of the invention, the automatic exchange CA1 is linked to a call-distribution server SRA having the role of Service Control Point (SCP) in the intelligent network via a transit center CT serving several automatic exchanges and here having the role of service-access exchange SSP.

A local directory inquiry center CRL is also represented in FIG. 1, and handles inquiry calls originating from the user terminals, especially those attached to the automatic exchange CA1, such as the terminal TU, and which is served by several lines, for example B data channels of an ISDN primary access, via a second automatic exchange CA2. Another directory inquiry center CR linked to an automatic exchange CA3 is also shown in FIG. 1, although, in practice, many other inquiry centers are linked to the network RTC.

More generally, the call-distribution server SRA handles the routing of the inquiry calls for an entire territory, such as France, and serves several transit centers which are themselves each linked to several automatic telephone exchanges.

The intelligent-network architecture allows a concentration of the handling of the routing of the calls to all the inquiry centers CR in the server SRA without requiring interrogations between the inquiry centers CR. For implementing the invention, an inquiry telephone call results from the dialing of the conventional call number 12 from any fixed telephony terminal TU and the routing of the call via the connecting automatic exchange CA1 to the call-distribution server SRA.

To each user terminal TU of a predetermined geographical zone, for example all the terminals attached to the automatic exchange CA1, the server SRA allocates a "local" inquiry center, designated by CRL in the case of the terminal illustrated TU in the remainder of the description. With each inquiry center CRL, the server SRA associates a list of inquiry centers LCR to one of which the inquiry call from the terminal TU could be directed when the local inquiry center CRL is in a waiting state or in a saturated state, as will be seen later on. An inquiry call sent by a user terminal TU is thus handled by the call-distribution server SRA which, on the basis of the cyclic algorithm described below by reference to FIG. 2, decides to direct the call to the local inquiry center CRL to which the terminal TU is attached, or else to one of the inquiry centers set out in the list LCR associated with the inquiry center CRL.

In order to manage the distribution of the calls, the server SRA has available a copy of the call-processing signals of all the inquiry centers CR, and, in particular, knows the instant of pick-up by the telephone agents in each inquiry center so as to determine a forecast waiting time A for each inquiry center, without exchange of service data between the inquiry centers.

Typically, the server SRA manages the routing of inquiry calls to about thirty inquiry centers CR in which about 4500 telephone agents are distributed.

Figure 2:
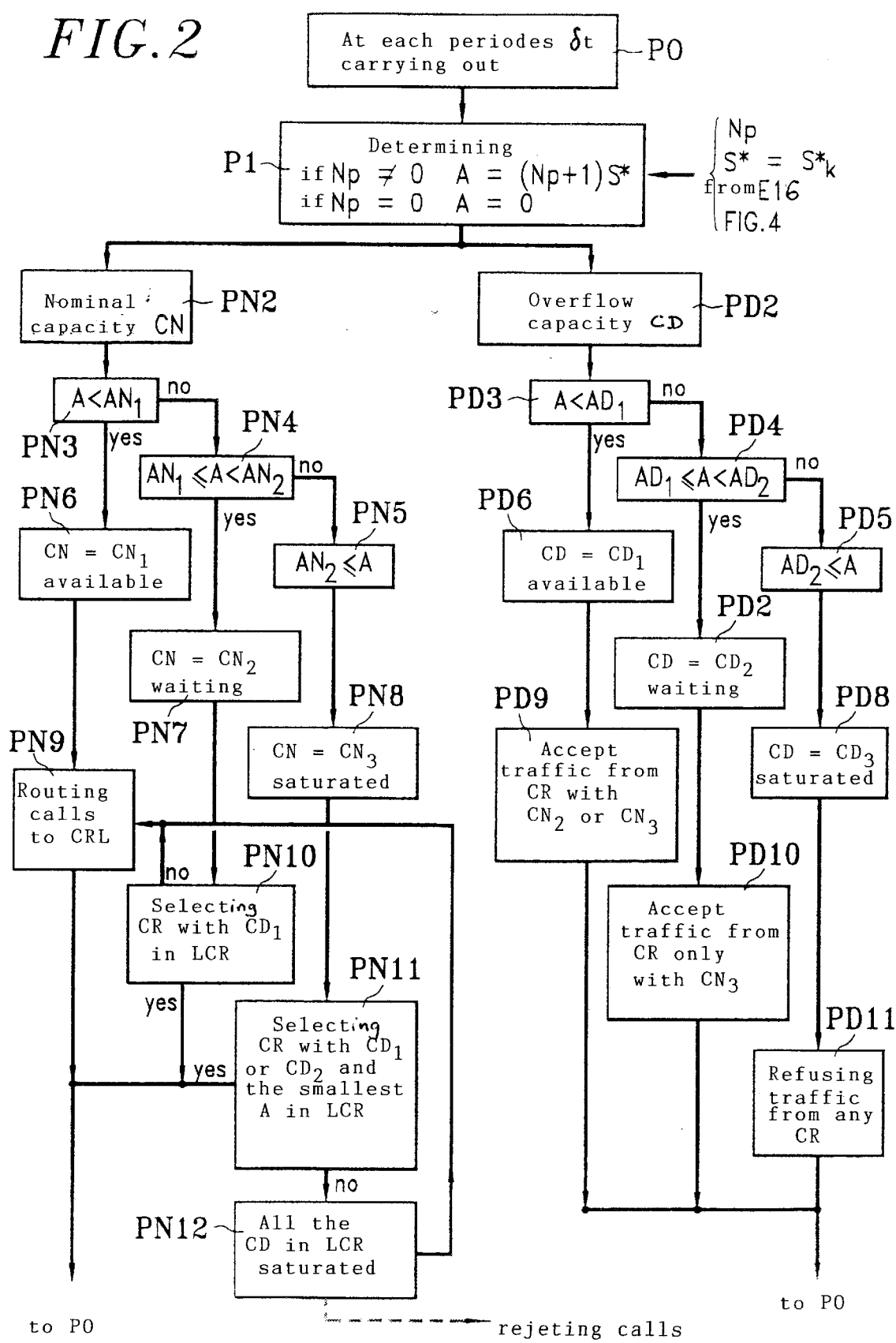
FIG. 2 is a call-distribution algorithm relating to an inquiry center, which is implemented in the call-distribution server.

FIG. 2 relates to the distribution of the inquiry calls originating from user terminals attached to the local inquiry centers CRL, while knowing that the server SRA, in parallel, manages in the same way inquiry calls originating from other terminals attached to the other inquiry centers.

As indicated at the start of the cyclic algorithm, at an initial step P0, the cycle of the succeeding steps is carried out at each period δt, so as to determine the states of the inquiry center CRL and to take the decision on routing of the calls to this inquiry center or to one of the inquiry centers from the list LCR associated with it, throughout the entire period δt. The period δt is programmable in the server SRA, typically between one second and one minute.

At the following step P1, it is assumed that, during the period δt, a load indicator of the inquiry center CRL consisting of the forecast waiting time A has already been determined, as will be described in detail later on in the description. The forecast waiting time A for an inquiry center CR is equal to the product of the number of parked calls Np+1, i.e. the number of calls put in waiting in the inquiry center, including the call currently being processed, multiplied by an estimate of the average time between two successive agent pick-ups in the inquiry center. Thus, the forecast waiting time A is the forecast of the duration for which an inquiry call should be in waiting before being attended to by an operator of the inquiry center if the call were sent to this inquiry center.

As indicated by parallel steps PN2 and PD2 succeeding the step P1, the local inquiry center CRL is characterized by a nominal capacity CN and an overflow capacity CD. The nominal capacity CN represents the capacity of the inquiry center CRL to absorb its own local traffic so as to determine whether this local traffic should be dealt with by the inquiry center CRL itself or else should be routed to another inquiry center selected from the associated list LCR. The overflow capacity CD is the capacity of the inquiry center to absorb external telephone traffic originating from the other inquiry centers with which lists are associated including the local inquiry center CRL, so as to determine whether the overflow traffic originating from the other inquiry centers can be dealt with by the local inquiry center CRL.

Each of the nominal CN and overflow CD capacities exhibits three states, an available state $CN_1$, $CD_1$, a waiting state $CN_2$, $CD_2$, and a saturated state $CN_3$, $CD_3$. The state of each capacity CN, CD is determined on the basis of the forecast waiting time A and of two respective thresholds $AN_1$ and $AN_2$ in the case of the nominal capacity CN, and $AD_1$ and $AD_2$ in the case of the overflow capacity CD.

By reference to the left-hand part of the algorithm of FIG. 2, the determining of the state of the nominal capacity CN will first of all be described, during a period δt. At the start of the cycle with period δt, it is assumed, at step PN2, that the nominal capacity of the center CRL is in the state $CN_i$, with i=1, 2 or 3, the state $CN_i$ corresponding to the variable A lying between two thresholds $AN_{i-1}$ and $AN_i$, with $AN_0$=0 and $AN_3$ equal to a large number representing infinity.

At the following steps PN3, PN4 and PN5, the variable A is compared with the lower threshold $AN_1$ and with the upper threshold $AN_2$ which determine the three states of the nominal capacity:

if $A<AN_1$, then the state of the nominal capacity is $CN_1$ (step PN6), which means that the inquiry center CRL is available to handle local inquiry calls;

if $AN_1<A<AN_2$, then the nominal capacity is in the state $CN_2$ (step PN7), and the inquiry center places in waiting the inquiry calls which it is receiving;

if $A>AN_2$, the nominal capacity is in the state $CN_3$ (step PN8), indicating that the inquiry center CRL is saturated by the calls and is not capable of handling them all.

According to a first embodiment, the state of the nominal capacity is changed as soon as the variable A has crossed one of the thresholds $AN_1$ or $AN_2$. Thus, if the variable A is below $AN_{i-1}$, the state of the capacity changes to the lower state $CN_{i-1}$, and if the variable A has crossed the threshold above $AN_i$, the state of the nominal capacity changes to the higher state $CN_{i+1}$.

Depending on the state CN of the nominal capacity determined above, which may be the available state $CN_1$, the waiting state $CN_2$ or the saturated state $CN_3$, as indicated in steps PN6, PN7 and PN8, the call-distribution server SRA determines the routing of the calls normally to be routed to the inquiry center CRL.

If the state CN is the available state $CN_1$, i.e. if the variable A is below the first threshold $AN_1$, the waiting time for a call is too small to be significant. The server SRA directs all the calls to the local inquiry center CRL which deals with its local traffic, even if other inquiry centers CR exhibit forecast waiting times A which are below those of the center CRL (step PN9).

If the state CN is the waiting state $CN_2$, i.e. if the variable A lies between the lower threshold $CN_1$ and the upper threshold $CN_2$, the server SRA directs the local traffic intended initially for the inquiry center CRL to another inquiry center CR on condition that the latter is in the available state $CD_1$ as regards its overflow capacity (step PN10). The server SRA cyclically runs through the list of inquiry centers LCR in order to find an available inquiry center in this list. If, at step PN10, no other inquiry center on the list LCR is available to receive the traffic of the center CRL, the local traffic is then directed to the inquiry center CRL itself (step PN9).

If the state CN of the nominal capacity is the saturated state $CN_3$ at step PN8, i.e. if the variable A is above the threshold $AN_2$, the server SRA looks, at step PN11, to see whether another inquiry center CR on the associated list LCR exhibits an overflow capacity in the available state $CD_1$, or in the waiting state $CD_2$ so as to be able to absorb the traffic intended normally for the inquiry center CRL. In order to choose the other available or waiting inquiry center, the server SRA selects the one which exhibits the smallest forecast average waiting time A. Hence, the other inquiry center to which the calls of the center CRL are directed is, in priority, a center with an overflow capacity in the available state, and, if none exists, a center with an overflow capacity in the waiting state.

If, at step PN11, the server SRA does not find any other inquiry center the overflow capacity of which is in the available state or in the waiting state on the list LCR, i.e. if all the other inquiry centers have their overflow capacity in the saturated state $CD_3$ (step PN12), the server SRA decides, according to a first variant, to direct the calls, notwithstanding, to the inquiry center CRL which will then be placed in waiting state (step PN9), or else, according to a second variant, to reject the calls.

After the steps PN9, PN10 and PN11, the call-distribution method comes back to step P0.

As shown on the right in FIG. 2, steps PD2 to PD11 determine the state $CD_i$ of the overflow capacity of the local inquiry center CRL with respect to thresholds $AD_{i-1}$ and $AD_i$ of the forecast waiting time A, i.e. with respect to a lower threshold $AD_1$ and an upper threshold $AD_2$, in a way which is similar to steps PN2 to PN11, the letter N being changed for the letter D in the identifiers.

If the state CD of the overflow capacity is the available state $CD_1$ (step PD6), i.e. if the variable A is below the lower threshold $AD_1$, the server SRA marks the local inquiry center CRL so that it will accept traffic originating from other inquiry centers CR the nominal capacities of which are in the waiting state $CN_2$ or in the saturated state $CN_3$ (step P9).

If the overflow capacity CD of the inquiry center CRL is in the waiting state $CD_2$ (step PD7), i.e. if the variable A lies between the lower threshold $AD_1$ and the upper threshold $AD_2$, the center CRL refuses traffic from any other inquiry center CR except if the latter exhibits a nominal capacity in the saturated state $CN_3$ (step PD10).

When the overflow capacity CD of the center CRL is in the saturated state CD3 (step PD8), the server SRA refuses to direct calls originating from other inquiry centers CR to the inquiry center CRL (step PD11).

After the steps PD9, PD10 and PD11, as after the steps PN9, PN10 and PN11, the method returns to step P1 for a new cycle with a period $\delta t$.

In FIG. 2, the thresholds $AN_1$ and $AN_2$ for the nominal capacity are, a priori, different from the thresholds $AD_1$ and $AD_2$ for the overflow capacity. However, in order to simplify the algorithm, provision is made in a variant for the thresholds $AN_1$ and $AD_1$ to be equal and the thresholds $AN_2$ and $AD_2$ to be equal; in this variant, the nominal and overflow capacities CN and CD are coincident and thus the steps PN2 to PN11 are respectively merged with steps PD2 to PD11.

In the preceding embodiment shown in FIG. 2, the forecast waiting time variable A causes a change of state of one of the nominal and overflow capacities CN and CD, as soon as the variable A crosses one of the thresholds $AN_1$, $AN_2$, $AD_1$ and $AD_2$; for example, one of the capacities can change directly from the available state to the saturated state and conversely. Such a rapid change of state is thus upsetting for the operation, all the more so as the period $\delta t$ is small, of the order of one second.

Figure 3:
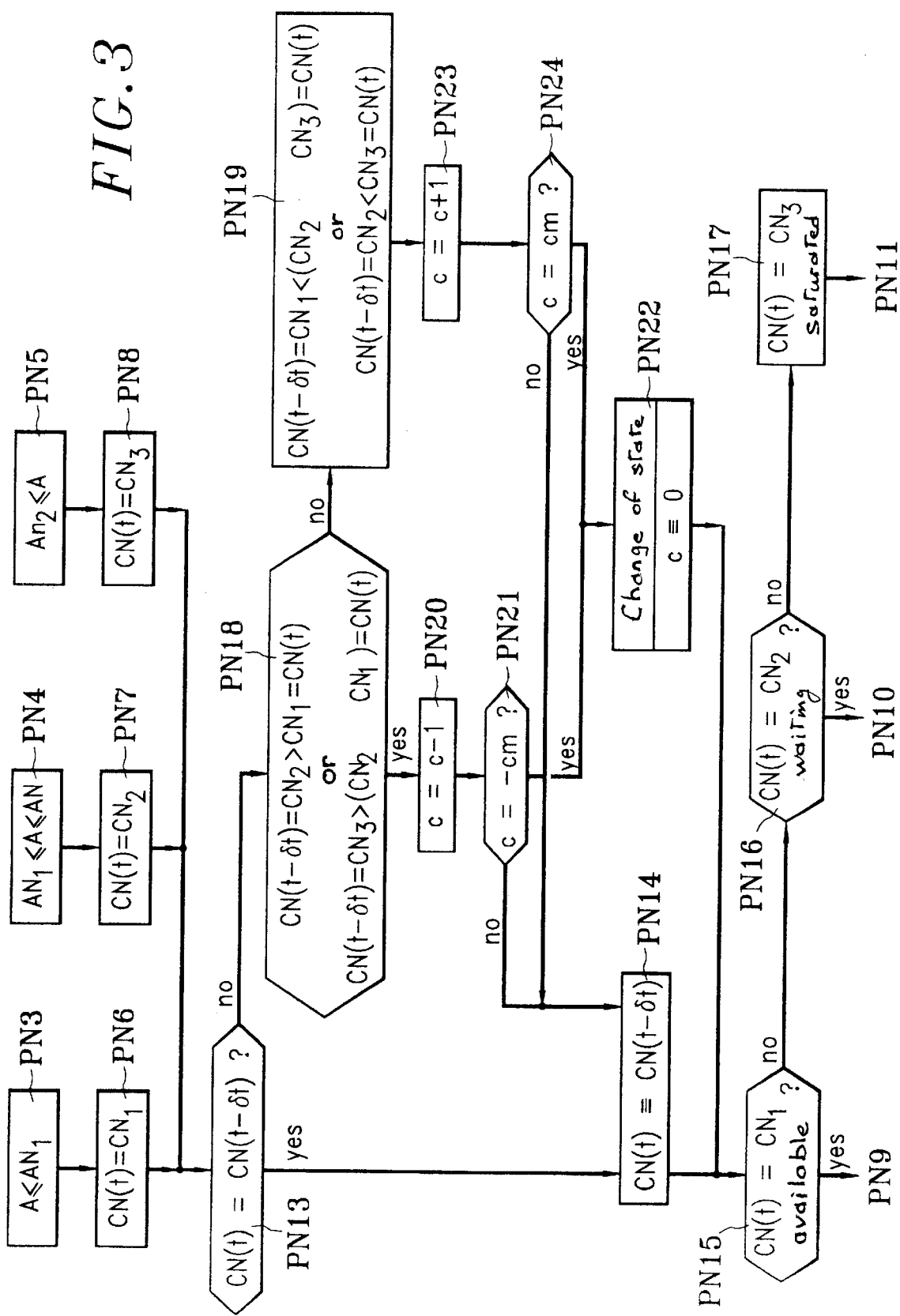
FIG. 3 is another implementation of a part of the call-distribution algorithm of FIG. 2 for hysteresis filtering of the changing of forecast waiting time.

The second embodiment shown in FIG. 3 remedies this drawback by "hysteresis" filtering of the crossing of each threshold $AN_1$, $AN_2$, $AD_1$ and $AD_2$, which imposes inertia on the change of state. This filtering thus avoids each inquiry center changing state at each period $\delta t$.

This second embodiment is described by reference to FIG. 2 as regards the crossing of the thresholds $AN_1$ and $AN_2$ relating to the nominal capacity CN between the pairs of steps PN3–PN6 to PN5–PN8 and the steps PN9 to PN11, the "hysteresis" filtering relating to the overflow capacity CD being similar to that shown in FIG. 3, the letter N in the identifiers being changed for the letter D.

The nominal-capacity state CN(t) for the cycle period in progress at the instant t is compared with the nominal-capacity state CN(t–$\delta t$) for the preceding period at the step PN13 succeeding the steps PN6, PN7 and PN8. If these nominal-capacity states CN(t) and CN(t–$\delta t$) are identical, there is no change of state as indicated at step PN14, and the method carries on with the steps PN9 to PN11 depending on whether the state CN(t) is the available state $CN_1$, the waiting state $CN_2$ or the saturated state $CN_3$ to be verified at respective steps PN15, PN16 and PN17.

In contrast, at step PN13, if the successive states CN(t–$\delta t$) and CN(t) are different, step PN18 or PN19 checks whether state CN(t) for the period in progress is less than or higher than the preceding state CN(t–$\delta t$). If one of the thresholds $AN_1$ and $AN_2$ has been crossed in descending from the state $CN_2$, $CN_3$ to the state $CN_1$, $CN_2$, the count c of a counter, initially set to zero and associated with the center CRL, is decremented by one unity (step PN20) and the state CN is not modified (step PN14), as long as the count c is greater than a minimum limit –cm (step PN21, no). In contrast, as soon as the count c reaches the minimum limit –cm, the state CN(t) of the nominal capacity changes to the lower state $CN_1$, $CN_2$ (step PN22) and the count c is reset to zero.

Conversely, if one of the thresholds $AN_1$, and $AN_2$ has been crossed on rising from the state $CN_1$, $CN_2$ to the state $CN_2$, $CN_3$, the count c of the counter is incremented by one unity (step PN23). As long as the count c has not reached a maximum limit +cm (step PN24, no), the state CN(t) of the nominal capacity is not modified (step PN14). In contrast, as soon as the count c reaches the maximum limit cm, the state CN(t) of the nominal capacity changes to the higher state $CN_2$, $CN_3$ (step PN22) and the count c is reset to zero.

After the steps PN14 and PN22, the method continues with the steps PN15, PN16 and PN17.

Figure 4:
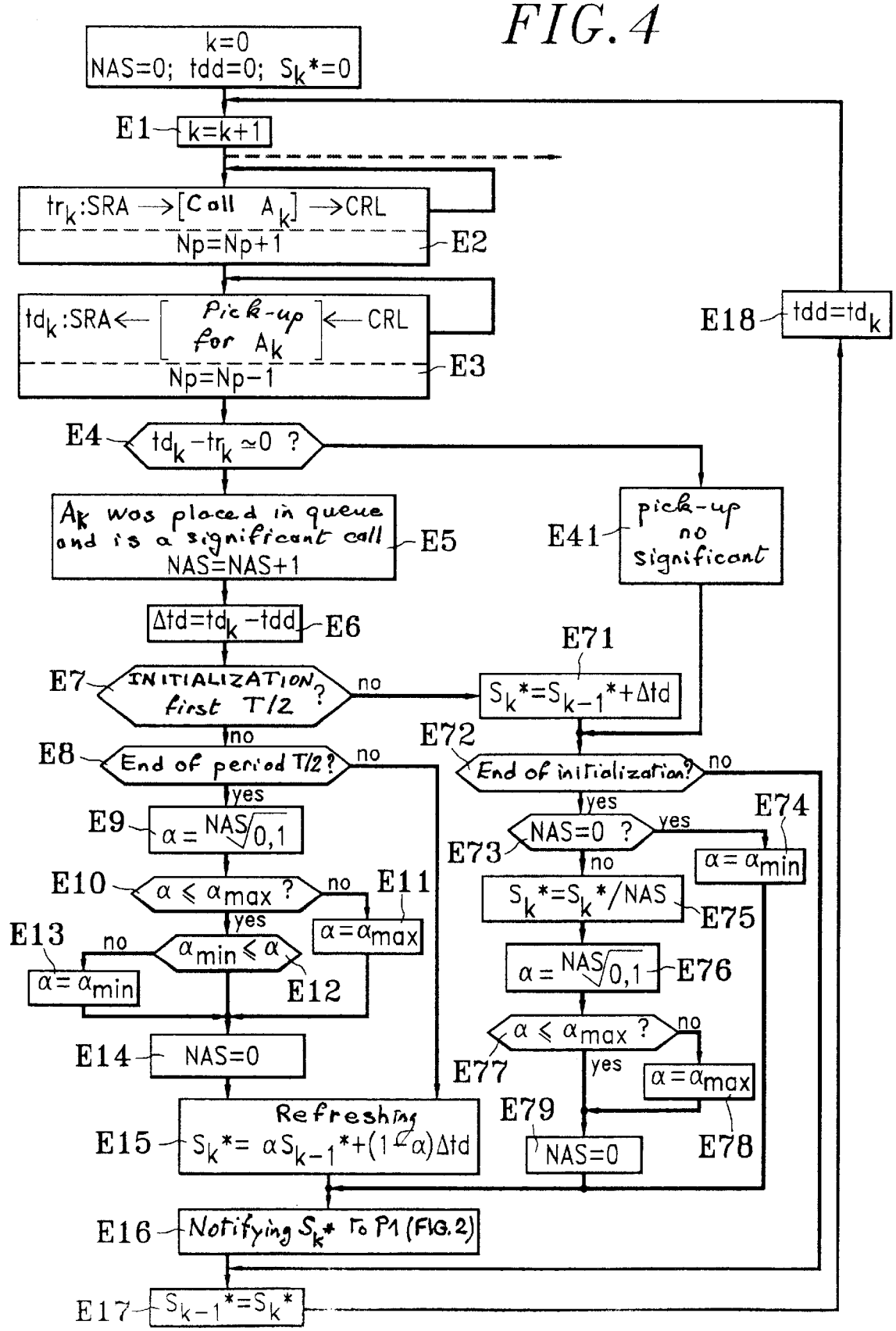
FIG. 4 is an algorithm for predicting the estimated average waiting time according to the invention.

By virtue of this "hysteresis" filtering according to FIG. 4, transitions from the available state to the saturated state or from the saturated state to the available state of each of the capacities CN, CD are no longer possible: passing through the waiting state is systematic. Since the count c is reset to zero upon each change of state (step PN22), at least cm comparisons are necessary in order to change state. The state of loading of each inquiry center CRL being determined every period $\delta t$, that means that there are at least cm.$\delta t$ seconds between two successive changes of capacity state. The filtering according to this second embodiment thus guarantees a minimum stability on the state of the inquiry centers.

A high value of the limit cm, for example cm.$\delta t$=45 sec., eases operation since the state of the inquiry centers thereby becomes more stable.

The choice of the limit cm therefore arises from a compromise to be found in operation between performance and stability.

As was said at step P1 (FIG. 2), the forecast waiting time A is a function of the number of parked calls Np, i.e. calls placed in the queue in the inquiry center CRL, and of an estimate of the average time for processing a call S* between two agent pick-ups in the center CR, i.e. A=(Np+1)S*.

The foregoing formula for determining the forecast waiting time A was deduced from the following reasoning.

If an inquiry center CRL is considered, including NOP agents for whom the average duration of conversation for an inquiry request is H, an inquiry call is in waiting on average H/NOP seconds before being attended to by an agent in the center CRL if it is sent to this center by the server SRA. This average waiting time perceived by the user is denoted S.

If, at a given instant, the queue of calls in the inquiry center CRL includes Np calls, with Np>0, then a call arriving in the queue should wait for:

$(Np+1)H/NOP=(Np+1)S$ seconds, before being attended to by an agent of the center CRL. This average waiting time constitutes the actual call load on the center CRL.

However, the server SRA is unaware of the number of agents NOP in each inquiry center, as well as the average duration of conversation H. The average waiting time duration S perceived by the user is therefore not known to the server SRA.

The average waiting time S is estimated according to the invention. The average waiting time estimated is denoted S*, and is determined according to the algorithm of FIG. 4 described later on. The forecast waiting time A is determined at step P1 in the following way:

if $Np \neq 0$ then $A=(Np+1)S^*$ if $Np=0$ then $A=0$.

As is apparent from the incrementing of an index k at a first step E1 in the algorithm of FIG. 4, the variables Np and S* are updated upon each current call $A_k$, although the forecast waiting time A is updated every period δt.

In the case in which Np=0, i.e. in the case where the queue in the inquiry center CRL is empty, it is assumed that at least one agent is free, and thus the forecast waiting time is zero.

In order to keep the two variables Np and S* up to date, the call-distribution server SRA knows, for each call, on the one hand, the instant of reception $tr_k$ of a call $A_k$ placed in the queue, since the server signals this call reception to the inquiry center CRL, as indicated at a step E2 in FIG. 4, and, on the other hand, the instant $td_k$ of the end of the period for which the call $A_k$ was in waiting, signaled by an agent pick-up message, or else a hang-up or release message, transmitted by the center CRL to the server SRA, as indicated at a step E3 in FIG. 4. Hence, upon each arrival of a call, the number Np is incremented by one unity (step E2) and, upon each pick-up by an agent, the number Np is decremented by one unity (step E3). The number Np is thus known to the server SRA.

The estimated value S* of the average waiting time S on the basis of the average of the differences in time between two successive pick-ups is determined in the following way according to the invention.

When the queue in the inquiry center CRL is not empty, the duration separating two successive pick-ups Δtd, i.e. as indicated at step E6 in FIG. 4, the difference between the time $td_k$ at which an agent has picked up in response to the call $A_k$ which has been placed in the queue, and the time tdd of the last pick-up by an agent in the inquiry center, is quite representative of the capacity of the center CRL to deal with the call. In contrast, if the call queue in the center CRL is empty, a call which arrives at the center CRL is attended to immediately, without waiting. The duration between this pick-up for a call with no waiting time and the last pick-up is no longer representative of the capacity of the center CRL, but depends on the instant of arrival $td_k$ of the current call $A_k$.

For this reason, the invention considers that an instant of pick-up is "significant" when the agent takes a call $A_k$ which has waited for in the queue. Hence, as indicated at a step E4 in FIG. 4, when the difference between the time $td_k$ of the pick-up of the call $A_k$ and the time of reception $tr_k$ of this call is substantially zero, i.e. when the call $A_k$ is attended to practically immediately, the pick-up is regarded as not significant (step E41) and the current estimated value of the average waiting time $S_k^*$ is not refreshed, the algorithm of FIG. 4 passing from step E4 to a step E17.

As indicated at a step E5 succeeding the step E4, upon each significant pick-up, i.e. after each placing of a call $A_k$ in waiting, for which the waiting time duration $td_k-tr_k$ is other than zero, the server SRA increments, by one unity, a number NAS of significant calls and calculates a new estimated value S* of the average waiting time S in the following steps.

The estimated value $S_k^*$ for the current call $A_k$ is determined by weighting of the last estimated value $S_{k-1}^*$ and of the time difference Δtd between the instant of pick-up $td_k$ of the current significant call $A_k$ and the instant of the last pick-up tdd, whether the last pick-up tdd was or was not significant as determined at a step E6 succeeding the step E5, according to the following formula $S_k^* = \alpha S_{k-1}^* + (1-\alpha)\Delta td$.

Δtd is thus the drawing of a random variable the average of which is equal to S by definition, and α denotes a smoothing factor lying between predetermined minimum and maximum limits less than 1.

If the factor α is close to 1, the last sample of pick-up difference Δtd is not important in the estimate. The estimated value $S_k^*$ is thus very stable and does not vary abruptly in the case of a peak in traffic. It is smoothed. However, it requires a large number of samples in order to vary.

Conversely, when the smoothing factor α diminishes, the estimated value $S_k^*$ is less smoothed and thus more reactive. The number of Δtd samples necessary to cause the value of $S_k^*$ to vary is less high. In contrast, the estimated value $S_k^*$ is less stable and more sensitive to the variations in traffic.

As indicated at a step E7 succeeding the step E6, the predictive algorithm shown in FIG. 4 comprises an initialization period of duration T/2, typically of 15 min which, for each call $A_k$, comprises steps E71 to E78. During this initialization period, the first estimated value of the average waiting time $S_k^*$ is determined by way of all the samples of pick-up time difference Δtd during the period T/2, as indicated at steps E71 and E75:

$$S_k^* = \frac{1}{NAS} \sum_{k=1}^{k=NAS} \Delta t_d$$

Thus, the first estimate is made in step with the picking-up of significant calls during the first period T/2. At the end of the initialization of step E72, the first value of the smoothing factor α is also determined. If, during the initialization, there has not been any significant call, i.e. NAS=0, the estimated value $S_k^*$ of the average waiting time is equal to zero (change from step E4 to step E72 via step E41), and the smoothing factor α is set to a minimum limit $\alpha_{min}$ typically equal to 0.8 as indicated at steps E73 and E74. In contrast, when there is at least one significant call during the initialization (step E73, no), the smoothing factor α is calculated according to a formula detailed below at step E76 as long as this formula does not give a smoothing factor greater than a maximum limit $\alpha_{max}$ as indicated at step E77. In the opposite case, at step E78, the value of the smoothing factor is set equal to the limit $\alpha_{max}$, typically equal to 0.95. Finally, the number of significant calls NAS is set to zero for the second period T/2 at step E79.

The values $S_k^*$ and α thus determined at steps E74 to E78 initiate the prediction algorithm of FIG. 4 in order, upon each significant call, to determine the estimated value of the average waiting time $S_k^*$ and to update the value of the smoothing factor α at each T/2 period, as explained below.

The choice of the smoothing factor α stems from the following constraints, in order to obtain a good estimate of the average waiting time S:

the estimation error should be low, that is to say the estimate should be stable;

the predictive algorithm should be sufficiently reactive to take account of abrupt variations in numbers of agent staff in the inquiry center CRL, and thus of abrupt variations in the average waiting time S, during a reasonable time.

During daytime, especially during working hours, when the number of agents of the inquiry centers CR is fairly high and the traffic is sufficiently heavy for the queues of the inquiry centers not to be empty, the acquisition of a large number of $\Delta td$ samples takes place over a very short duration. The smoothing factor $\alpha$ can then be chosen to be close to 1. Although the smoothing is powerful, the high number of samples $\Delta td$ allows fairly rapid updating of the estimated value of average waiting time S*. The high smoothing thus ensures a reliable estimate, with low variance, in which the noise spikes are well damped.

In contrast, in the case of small inquiry centers CR, or during slack periods, such as during the night or during meal times, the number of operators is fairly restricted and such an inquiry center receives low traffic, typically of the order of 100 calls at most about every hour. The acquisition of about a hundred $\Delta td$ samples may then take up to one hour. The invention then reduces the number of samples in the calculation of the estimated value S* so as to increase the reactivity of the prediction algorithm, which amounts to reducing the smoothing factor $\alpha$. The prediction algorithm retains sufficient reactivity, although the estimated value S* is much less stable.

The smoothing factor $\alpha$ is determined by assuming that, if an impulse $\Delta td=1$ is observed, followed by n zero $\Delta td$ samples, then the response $S_n^*$ to this impulse is deduced by the recurrence of the formula for the estimated value:

$$S_1^* = (1-\alpha)$$

$$S_2^* = \alpha S_1^*$$

$$S_n^* = \alpha^{n} \cdot S_1^*, \text{ i.e.:}$$

$$S_n^* = \alpha^n (1-\alpha) \text{ with } 0<\alpha<1.$$

Figure 5:
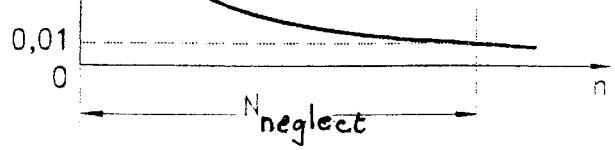
FIG. 5 is a graph for determining a smoothing factor of the estimated average waiting time.

FIG. 5 represents the variation $\alpha^n = S_n^*/(1-\alpha)$ as a function of the index n.

If $N_{neglect}$ denotes the number of $\Delta td$ samples necessary for the impulse response to be less than 1%, $N_{neglect}$ represents the period during which the weight of the sample is still significant in the calculation of the estimate. This duration varies as a function of $\alpha$; if $\alpha$ is close to 1, $N_{neglect}$ is large, and, the more $\alpha$ reduces, the more $N_{neglect}$ reduces.

Let T be the time necessary to acquire $N_{neglect}$ samples $\Delta td$. In order for the predictive algorithm to be sufficiently reactive, the invention stipulates that the estimated value S* be completely refreshed in T minutes at most. The duration T can be set as a parameter in the server SRA and is chosen typically to be equal to 30 min.

In order to determine the value of the smoothing factor $\alpha$, the number of samples NAS during the last T/2 minutes is counted, and n=2. NAS samples $\Delta td$ are assumed to be received during the following T minutes. In accordance with an impulse response of <1% as indicated above, the relationship between $\alpha$ and NAS is: $\alpha^{2 \cdot NAS} = 0.01$, i.e.

$$\alpha = \sqrt[NAS]{0.1}$$

Thus, as indicated in the lower part E8 to E15 on the left of FIG. 4, at the end of each T/2 period, at step E8, the value of the smoothing factor $\alpha$ is determined according to the preceding formula (step E9). Then the $\alpha$ value determined is compared with an upper limit $\alpha_{max}$, typically equal to 0.95 (step E10) and with a lower limit $\alpha_{min}$, typically equal to 0.8 (step E11) and so as to keep the smoothing factor $\alpha$ lying between $\alpha_{min}$ and $\alpha_{max}$. Otherwise, the value of 60 is replaced by the maximum limit $\alpha_{max}$ (step E12) or the minimum limit $\alpha_{min}$ (step E13). Then the number of significant calls NAS is reset to zero for the next T/2 period (step E14).

Next, the estimated value of the average waiting time $S_k^*$ is refreshed by determining it according to the formula mentioned above at step E15, and notified to step P1 of the call-distribution algorithm (FIG. 2), at step E16, so as to determine the forecast waiting time A according to the invention. Finally, the variable $S_{k-1}^*$ is set equal to the variable $S_k^*$ (step E17) and the time variable of the last pick-up tdd is set to be equal to $td_k$ (step E18).

In a variant, in order to lighten the workload on the server SRA, the value of the estimated average waiting time $S_k^*$ is refreshed at the end of each T/2 period at the same time as the determination of the smoothing factor $\alpha$; the "no" link between the steps E8 and E15 in FIG. 4 is replaced by a "no" link between the steps E8 and E18, and step E6 stores the time-difference sample $\Delta td$ in memory only for the significant call at the end of the period T/2 at step E8.

According to yet another variant, the majority of the steps of the predictive algorithm of FIG. 4 can be incremented in the inquiry center in question CRL so that, after each pick-up for a significant call, it transmits not the instant of pick-up $td_k$ at step E3, but the refreshed value of the estimated average waiting time $S_k^*$ at step E15 so as to notify it to step P1 of the algorithm of FIG. 2, implemented in the server SRA.

Although the foregoing description refers to inquiry centers CR for fixed user telephony terminals "TU", the invention is also applicable in the fixed network of a radiotelephony network for mobile user telephone terminals. In FIG. 1, for this context in a radiotelephony network, TU designates a mobile radiotelephony terminal, CA1 designates a mobile-service switching center MSC, CT designates the signaling network specific to the radiotelephony network, and SRA and CR designate a call-distribution server according to the invention for radiotelephony user terminals and local inquiry centers for the radiotelephony network. The inquiry centers CR are then accessible, for example, by dialing the inquiry call numbers 512 or 712 in the case of France.

What is claimed is:

1. A method for distributing calls to directory inquiry centers, comprising a cycle of succeeding steps for a given inquiry center:

determining a forecast waiting time of the calls on the basis of a number of calls in waiting and of an estimated average waiting time per call in the given center, routing the calls to said given center when said forecast waiting time determined is below a first threshold, and accepting calls from other inquiry centers the forecast waiting times of which are above said first threshold, when said determined forecast waiting time is below a third threshold, routing the calls intended for said given center to another inquiry center on condition that the forecast waiting time in it is below said third threshold, when said determined forecast waiting time lies between said first threshold and a second threshold higher than said first threshold, and accepting calls from another inquiry center only if said forecast waiting time thereof is above said second threshold, when said determined forecast waiting time lies between said third threshold and a fourth threshold higher than said third threshold, and routing calls intended for said given center to another inquiry center the forecast waiting time of which is below said fourth threshold, when said determined forecast waiting time is above said second threshold, and refusing all calls from other inquiry centers when said determined forecast waiting time is above said fourth threshold.

2. The method as claimed in claim 1, wherein each inquiry center to which calls from said given center are routed is selected from a predetermined list of inquiry centers attributed to said given center.

3. The method as claimed in claim 2, wherein, when said each inquiry center has a forecast waiting time below said third threshold, said each inquiry center is found among the inquiry centers which are available by running cyclically through said predetermined list.

4. The method as claimed in claim 2, wherein, when said each inquiry center has a forecast waiting time below said fourth threshold, said each inquiry center exhibits the shortest forecast wait time of the list.

5. The method as claimed in claim 1, wherein said first threshold and third threshold are equal, and said second threshold and fourth threshold are equal.

6. The method as claimed in claim 1, wherein crossing of each threshold in a given direction by said determined forecast waiting time in the course of the cycle increments a count, and said step of routing or said steps of accepting or of refusing depending on this threshold is performed only when said count reaches a predetermined number during cycles preceding said cycle.

7. The method as claimed in claim 1, wherein said forecast waiting time of the calls is equal to the product $(Np+1)S_k^*$, Np denoting the number of calls placed in waiting in the given inquiry center which is incremented by one unity responsive to each call directed to said given center and which is decremented responsive to a pick-up for this call in the given center, and $S_k^*$ denoting an estimated average waiting time between two pick-ups in said given center.

8. The method as claimed in claim 7, wherein said estimated average waiting time $S_k^*$ is refreshed in response to the pick-up for each significant call in a queue in said given center according to the following relationship:

$$S_k^* = \alpha S_{k-1}^* + (1-\alpha)\Delta td,$$

$S_{k-1}^*$ denoting said estimated average waiting time for a preceding significant call, $\alpha$ a smoothing factor, and $\Delta td$ a difference between the instant of said pick-up for said each significant call and the instant of the pick-up of a call preceding said each significant call, whether said preceding call was or was not placed in waiting.

9. The method as claimed in claim 8, wherein said smoothing factor is determined as a function of the number of significant calls NAS per predetermined period, according to the formula:

$$\alpha = \sqrt[NAS]{0.1}.$$

10. The method as claimed in claim 9, wherein said smoothing factor lies between a minimum limit and a maximum limit which are less than 1, said minimum limit being equal to about 0.8 and said maximum limit being equal to about 0.95.

11. The method as claimed in claim 9, wherein during a first initialization period, said estimated average waiting time $S_k^*$ is equal to the average of the differences in pick-up times during the initialization period.

* * * * *